United States Patent [19]

Mills et al.

[11] 4,198,562
[45] Apr. 15, 1980

[54] ELECTRICALLY HEATED BEDCOVER WITH OVERHEAT PROTECTIVE CIRCUIT

[75] Inventors: Edwin R. Mills, Raleigh; Ernest L. Elmore, Smithfield, both of N.C.

[73] Assignee: Fieldcrest Mills, Inc., Eden, N.C.

[21] Appl. No.: 935,964

[22] Filed: Aug. 22, 1978

[51] Int. Cl.$^2$ .................................... H05B 1/02
[52] U.S. Cl. .................................... 219/505; 219/494; 219/501; 323/24; 363/68; 307/252 B; 219/212
[58] Field of Search ............... 219/490, 494, 497, 212, 219/501, 505, 507, 485; 307/252 B, 252 UA; 323/24, 39; 363/68

[56] References Cited

U.S. PATENT DOCUMENTS

| | | | |
|---|---|---|---|
| 3,356,825 | 12/1967 | Mills et al. | 219/494 X |
| 3,437,792 | 4/1969 | Lauck | 219/494 |
| 3,683,151 | 8/1972 | Mills et al. | 219/501 |
| 3,699,363 | 10/1972 | Roberts | 219/505 |
| 3,982,098 | 9/1976 | Trostler | 219/528 |
| 4,006,367 | 2/1977 | Ott | 307/252 B |

FOREIGN PATENT DOCUMENTS 2334409  1/1975  Fed. Rep. of Germany .......... 219/501

OTHER PUBLICATIONS

IBM Technical Disclosure Bulletin "Motor Start Switch", vol. 14, No. 6, 11-1971.

*Primary Examiner*—C. L. Albritton
*Assistant Examiner*—M. Paschall
*Attorney, Agent, or Firm*—Bell, Seltzer, Park & Gibson

[57] ABSTRACT

An electrical heating apparatus such as an electrically heated bedcover protected against an overheating condition by an overheat protective circuit which utilizes a pair of solid state switching devices in the heating element circuit. The solid state switching devices are so connected that should one switching device fail in a shorted or closed mode, a second switching device will be in the circuit to control the heating element and provide normal protection against an overheating condition. The solid state switching devices are employed in a manner which permits the use of relatively small light weight temperature sensors in the form of positive temperature coefficient devices such as PTC resistors, which avoids the need for using relatively bulky bimetallic thermostatic switches as are conventionally employed for sensing overheating conditions.

11 Claims, 4 Drawing Figures

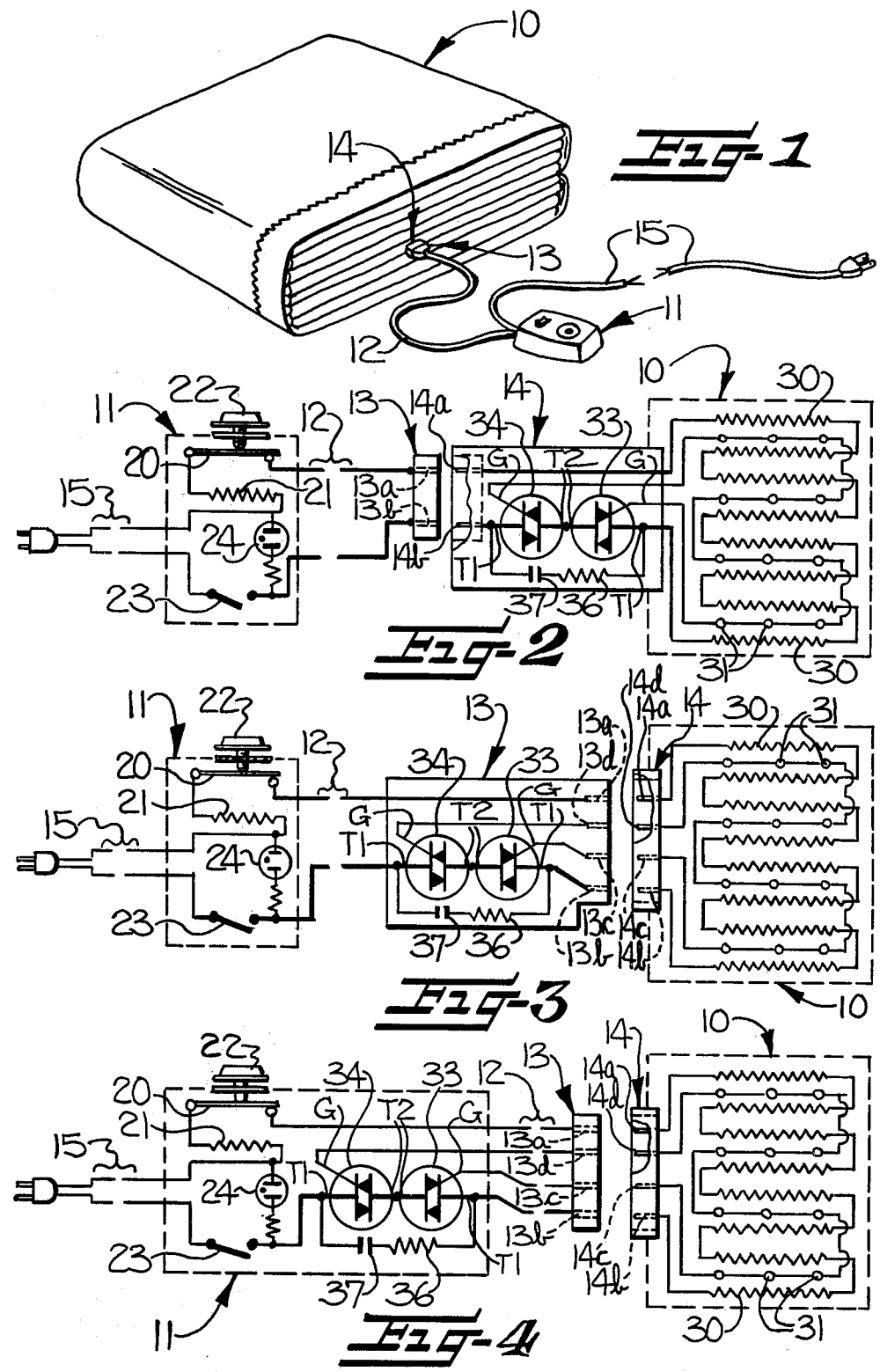

ELECTRICALLY HEATED BEDCOVER WITH OVERHEAT PROTECTIVE CIRCUIT

FIELD OF THE INVENTION

This invention relates to electrical heating, and in particular, to an electrical heating apparatus, such as an electrically heated bedcover, which is protected against an overheating condition.

BACKGROUND OF THE INVENTION

Electrically heated bedcovers, such as electric blankets, resemble conventional bedcovers but include an electrical heating element, such as a resistance wire, disposed therein to which voltage is applied to cause the element to heat and thereby provide warmth for a user.

Should the electrically heated bedcover be bunched, folded, or covered with a material having good thermal insulation quantities, an overheating condition may develop, either locally or generally throughout the bedcover. The overheating condition is detrimental to the material of the bedcover and could be dangerous to a user. With this problem in mind, electrically heated bedcovers conventionally include some type of overheat protection means for avoiding the dangerous and detrimental effects of overheating.

In one conventional arrangement, overheat protection for an electrically heated bedcover is provided by a plurality of normally closed bimetallic thermostatic switches disposed throughout the heated area of the bedcover and electrically connected in series with the electrical resistance heating element in the bedcover. Upon the occurrence of an overheating condition, the thermostats open and break the heating element circuit. Although relatively widely used, this approach is subject to a number of deficiencies. Most notably, the bimetallic thermostatic switches used for overheat protection must be of a relatively heavy-duty construction, and consequently are relatively bulky. A bedcover containing this type of thermostat exhibits a lumpy appearance which detracts from the commercial appeal of the bedcover and renders it subject to more rapid wear at the locations of the thermostat.

It has been proposed that overheat protection means in electrically heated bedcovers be constructed to avoid the aforementioned deficiencies of conventional bimetallic thermostats through the use of thermostatless sensing means for detecting the occurrence of an overheat condition. One such thermostatless sensing means employs a pair of signal wires having a temperature sensitive dielectric material therebetween. Another thermostatless sensing means, disclosed in our earlier U.S. Pat. No. 3,356,825 issued Dec. 5, 1967, uses positive temperature coefficient resistors or thermistors in the bedcover. While electrically heated bedcovers employing these types of thermostatless sensing means have been shown to be useful, such arrangements are neither compatible with existing ambient temperature responsive comfort controllers, nor are they as inexpensive to produce as the aforementioned more conventional arrangement using bimetallic thermostats.

Still another type of thermostatless overheat protection circuit is disclosed in our earlier U.S. Pat. No. 3,683,151, issued Aug. 8, 1972. This circuit employs a gate controlled semiconductor switch in a thermostatless overheat protection circuit for reducing the power delivered to the heating element in response to the occurrence of an overheating condition. While this protective circuit has been useful and successful, it utilizes a relatively expensive type of sensing wire and solid state control circuit.

With this background in mind, it is an object of the present invention to provide an electrically heated bedcover which is protected against an overheating condition and which is not subject to the deficiencies and limitations which are present in previously known electrically heated bedcovers.

It is a further object of the present invention to provide an improved overheat protective means which is applicable not only to electrically heated bedcovers, but also to various other kinds of electrical heating apparatus.

SUMMARY OF THE INVENTION

The overheat protective means of the present invention is characterized by relatively simple design, small size and low bulk, high reliability, and relatively low cost. The overheat protective means utilizes solid state switching devices for interrupting the flow of current to the heating elements in response to an overheating condition. The solid state switching devices are connected together in a unique but relatively simple manner to provide a very high degree of reliability and safety.

More particularly, the overheat protective circuit utilizes a pair of solid state switching devices so connected that should one switching device fail in a shorted or closed mode, a second switching device will be in the circuit to control the heating element and provide normal protection against an overheating condition. The solid state switching devices are employed in a manner which permits the use of relatively small light weight temperature sensors adapted for carrying low levels of current, and consequently avoids the need for using relatively bulky bimetallic thermostatic switches as are conventionally employed for sensing overheating conditions.

The solid state switching device used in the present invention is a gate controlled bidirectional semiconductor switch, frequently identified by the generic term "triac". A pair of these semiconductor switches is electrically connected to one another in series and in back-to-back orientation, and is electrically connected to the heating means for controlling the flow of electrical current thereto. A positive temperature coefficient sensing means is thermally coupled to the electrical heating means for sensing the occurrence of an overheating condition therein. The respective gates of the semiconductor switches are electrically connected to one another through the positive temperature coefficient sensing means for triggering the semiconductor switches from a conductive to a non-conductive state in response to the sensing of an overheating condition by the positive temperature coefficient sensing means.

BRIEF DESCRIPTION OF THE DRAWINGS

Some of the objects, features and advantages of the invention having been stated, others will appear as the the description proceeds when taken in connection with the accompanying drawing, in which FIG. 1 is a perspective view of an electrically heated bedcover and comfort control device of this invention;

FIG. 2 is a schematic drawing of a first form of the invention showing the wiring for the bedcover, the comfort control, and the overheat protective means, and wherein the switching devices are located in the bedcover;

FIG. 3 is a schematic drawing similar to FIG. 2 but showing a second form of the invention wherein the switching devices are located in the plug means which connects the comfort control to the bedcovers; and FIG. 4 is a schematic drawing similar to FIG. 2 showing a third form of the invention wherein the switching devices are located in the comfort control.

DESCRIPTION OF ILLUSTRATIVE EMBODIMENTS

The overheat protective means of the present invention will be described hereinafter in detail with particular reference to its application to an electric blanket. It should be understood however that the drawings and the following description are provided for the purpose of illustrating the present invention, and should not be considered as limiting. Those familar with this field will recognize that the overheat protective means may be used in association with other types of electrical heating apparatus besides the electric blanket specifically illustrated in the drawings.

Referring now more particularly to FIG. 1, an electrically heated bedcover in the form of an electric blanket protected against an overheating condition in accordance with the present invention is illustrated therein and includes a blanket generally indicated at 10 and a bedside comfort control housing 11. In use, the blanket 10 is typically spread upon a bed and the comfort control housing 11 is placed at a location convenient for the user, such as a night stand beside the bed. The circuitry within the bedside comfort control housing 11 and that within the blanket 10 are joined together during use by a suitable multiconductor cable 12, comprising two or more conductors or wires as may be required. Plug means including means plug members 13, 14 are provided respectively at the terminal end of the cable 12 and on the blanket 10 in order that the comfort control and the blanket may be separated when not in use, as for storage or laundering. A power cord 15 extends from the comfort control housing 11 and serves for connecting the electric blanket to a suitable source of alternating electric current.

The comfort control housing 11 contains circuitry adapted for regulating the blanket warmth in response to room temperature and the setting selected by the user. The comfort control circuitry may be of either the conventional mechanical design which employs a bimetallic element, or of solid-state design. In both of these known designs, the circuitry is operable for varying the average power delivered to the resistance heating elements of the blanket, either by cycling on and off to vary the amount of time during which alternating current is conducted, or by varying the voltage.

A conventional mechanical or bimetallic type of comfort control circuit is illustrated schematically in FIG. 2 and includes a bimetallic thermostatic switch 20, an adjacent ambient temperature compensating heater 21, an adjustment knob 22 for controlling the set point of the control device, a switch 23 for turning the blanket on and off, and a pilot light 24 for indicating when the blanket is operating.

The blanket 10 includes a textile blanket shell in which there is positioned an electrical heating element 30 preferably in the form of a single conductor or wire having a relatively high resistance so that the wire will be heated upon application of voltage thereto. The heating element 30 extends throughout the area of the blanket to be warmed, and preferably is arranged in a zig-zag pattern. When the mating plug members 13, 14 are connected together, as in use, the bimetallic switch 20 of the comfort control is electrically connected in series with the heating element 30. Thus, operation of the bimetallic switch 20 between conductive and nonconductive states controls the conduction of alternating current through the heating element 30 for generating heat in the blanket.

In order to protect against an overheating condition in the blanket, which might occur for example as a result of the blanket being folded, wadded, or covered over with a heavy bedcover or the like, overheat protection means is provided in the blanket. The overheat protection means includes overheat sensing means in the form of sensors 31 located in the blanket for sensing the occurrence of an overheating condition therein, and switching means connected to the overheat sensors and adapted for interrupting the application of voltage to the heating element 30 in response to the sensing of an overheating condition by the overheat sensors.

The overheat sensors 31 have a positive temperature coefficient, and are characterized by exhibiting an increase in resistance to the flow of alternating current in response to increased temperature.

Preferably, the positive temperature coefficient sensing means comprises a positive temperature coefficient impedance. In particular, one very suitable type of positive temperature coefficient impedance is a positive temperature coefficient (PTC) resistor, sometimes referred to as a thermistor. Another suitable type of positive temperature coefficient sensing means is a thermostatic switch, in which the resistance to flow of current becomes substantially infinite when the thermostatic switch opens in response to a rise in temperature to a predetermined degree. Most desirably, because of relatively small size, reliability, and relatively low cost, PTC resistors are employed as the positive temperature coefficient sensing means in this invention.

In some applications of the overheat protective means of this invention, a single positive temperature coefficient device may be adequate as an overheat sensor for sensing the occurrence of an overheating condition. Preferably however, and especially in electrically heated bedcover applications, a plurality of the devices is employed. As illustrated in FIG. 2, a plurality of the positive temperature coefficient sensors 31 are electrically interconnected in series by suitable conductor wires and the sensors are distributed at spaced locations throughout the heated area of the blanket.

The overheat sensors and the switching means now to be described are electrically connected together and to the heating circuit and serve for interrupting the flow of electrical current to the heating element in response to the occurrence of an overheating condition.

The switching means, as schematically illustrated in FIG. 2, employs a pair of gate controlled bidirectional semiconductor switches 33, 34 for controlling the application of line voltage to the heating elements. The semiconductor switches are connected to one another and to the heating elements in such a manner that, should one of the switches fail in a shorted or closed mode, the second switch will be operable to provide normal overheat protective circuit operation.

The gate controlled bidirectional semiconductor switches 33, 34 utilized in the present invention are frequently referred to in the art by the generic term "triac", and are available from various manufactuers. The triac is a bistable semiconductor device which can block voltage in either direction, conduct current in either direction, and can be triggered for conducting current in either direction by the application of positive or negative gate signals. The basic triac structure typically includes a terminal $T_1$ and an adjacent gate terminal G located on one side of the device, and a terminal $T_2$ on the opposite side. The region directly between terminal $T_1$ and $T_2$ is a p-n-p-n switch in parallel with a n-p-n-p switch. The schematic symbol for the triac is composed of the popularly accepted triangular SCR symbol, combined with the complimentary SCR symbol. The gate terminal G is indicated by a line emanating from the $T_1$ side of the schematic symbol at an angle with respect to the line which represents the $T_1$ terminal. Terminal $T_1$ is the reference point for measurement of voltages and currents at the gate terminal G and at terminal $T_2$. Because of the structure and the physical appearance of the triac, the $T_1$ terminal side of the triac is often regarded as the "front" of the triac and the $T_2$ terminal side of the triac is regarded as the "back" of the triac, and for ease of understanding, this terminology is used in the present disclosure and claims in describing the orientation of the triac.

Referring now to FIG. 2, it will be noted that in the overheat protective means of this invention, the triacs 33, 34 are electrically connected to one another in series and in "back-to-back" orientation, i.e. with the "backs" or $T_2$ terminals electrically connected to one another. The remaining $T_1$ terminals of the two back-to-back triacs 33, 34 are connected in series in the heating circuit so as to collectively serve as a switching element for controlling the conduction of electric current to the heating element 30.

The respective gates G of the two triacs 33, 34 are connected to one another through the series-interconnected positive temperature coefficient sensors 31 located in the blanket. When the gates of the two triacs are connected together in this manner, each triac triggers the other through the positive temperature coefficient sensors 31. More particularly, an alternating current gate signal is obtained from the leakage voltage normally present at the gate terminal of each triac during one of the half cycles of the alternating current. This alternating current gate signal is applied through and modulated by the positive temperature coefficient sensors 31 to the gate of the other triac and provides the gate signal for that triac.

During normal operation, because of the relatively low resistance or impedance of the positive temperature coefficient sensors 31, the gate signals pass through the positive temperature coefficient devices and trigger the respective triacs in phase relation with the cycles of alternating electric current such that substantially full cycles of alternating electric current are conducting through the triacs to the heating element 30. When an overheating condition occurs, however, the increased resistance or impedance of the positive temperature coefficient resistance sensors 31 reduces the gate signals to a level below that which is sufficient to trigger the triacs into a conductive state. Consequently, the triacs become non-conductive and interrupt the flow of current to the heating device. Because of the relatively low current flow of the gate signals, the PTC resistors or bimetallic switches used as the positive temperature coefficient resistance sensors 31 may be of small size and light duty construction.

Triacs and similar semiconductor switch devices may, under certain circumstances, be damaged by voltage transients in the power supply. Recognizing the possibility that such voltage transients may occur, it is preferred that the circuit include such resistance-capacitance and/or inductance components as are required to protect the triacs from damage by voltage transients, and as illustrated, a resistor 36 and capacitor 37 are shown in the control circuits of FIGS. 2, 3 and 4 for accomplishing this purpose.

Referring now more particularly to FIG. 2, it will be noted that in this embodiment of the invention the pair of semiconductor switches 33, 34, is housed in the plug member 14 which is carried by the blanket. Thus, all of the components of the overheat protective means are located at the blanket 10, and the blanket may be used in association with a conventional bedside comfort control 11 having a two conductor cable 12. The plug member 14 includes a pair of conductor pins 14a, 14b electrically connected to the semiconductor switches 33, 34 and to the heating element 30, while the plug member 13 at the terminal end of cable 12 includes a pair of sockets 13a, 13b electrically connected to the two conductors of cable 12 and adapted for matingly engaging the pins 14a, 14b.

The embodiment of the invention illustrated in FIG. 3 is quite similar to that previously described with reference to FIG. 2 and to avoid repetitive description, elements corresponding to those previously described with reference to FIG. 2 will bear the same reference characters, wherever applicable. Essentially, the embodiment of FIG. 3 differs from that of FIG. 2 only in that the pair of semiconductor switches 33, 34, is housed in the plug member 13 carried at the terminal end of the cable 12. As in the previous embodiment, a two conductor cable 12 may be employed for electrically connecting the bedside comfort control 11 with the blanket 10. However, mating plug members 13, 14 include, in addition to the cooperating pins and sockets 14a, 14b, 13a, 13b additional cooperating pairs of pins and sockets 14c, 14d, 13c, 13d for providing electrical connection between the respective gates G of the triacs housed in the plug member 13 and the positive temperature coefficient resistance sensors 31 located in the blanket 10.

The embodiment of the invention illustrated in FIG. 4 is also quite similar to the previously described embodiments of FIGS. 2 and 3, and again the same reference characters are employed to identify elements previously described. In this embodiment, the pair of semiconductor switches 33, 34 is located in the bedside comfort control housing 11. As in the embodiment of FIG. 3, the cooperating plug members 13 and 14 will require four conductor pins 14a, 14b, 14c and 14d, and four cooperating conductor sockets 13a, 13b, 13c and 13d. In addition, the cable 12 will require four conductors instead of two to provide electrical connection between the power source and the heating element, and also between the gates G of the triacs housed in the bedside comfort control housing 11 and the overheat sensors located in the blanket 10.

It should be apparent from three embodiments specifically illustrated herein that the semiconductor switches may be located as desired at various convenient locations in the blanket apparatus. It should further be understood that in the drawing and specification, there have been set forth preferred embodiments of the invention, and although specific terms are employed, they are used in a generic and descriptive sensor only and not for purposes of limitation.

That which is claimed is:

1. An electrical heating apparatus protected against an overheating condition and comprising electrical heating means for generating heat upon flow of electrical current therethrough, positive temperature coefficient sensing means thermally coupled to said electrical heating means for sensing the occurrence of an overheating condition therein, a pair of gate controlled bidirectional semiconductor switches electrically connected to one another in series and in back-to-back orientation, means electrically connecting said pair of semiconductor switches to said heating means for controlling the flow of electrical current thereto, and means electrically connecting the respective gates of said semiconductor switches to one another through said positive temperature coefficient sensing means for triggering the semiconductor switches from a conductive to a non-conductive state in response to the sensing of an overheating condition by said positive temperature coefficient sensing means.

2. Apparatus according to claim 1 wherein said positive temperature coefficient sensing means comprises a positive temperature coefficient impedance electrically connected between the respective gates of said semiconductor switches and positioned in close proximity to said electrical heating means for sensing the occurrence of an overheating condition therein.

3. Apparatus according to claim 2 wherein said positive temperature coefficient impedance comprises a plurality of positive temperature coefficient resistors electrically connected to one another in series and to the respective gates of said semiconductor switches.

4. An electrically heated bedcover protected against an overheating condition and comprising a bedcover, electrical heating means in said bedcover for generating heat upon flow of electrical current therethrough, positive temperature coefficient sensing means located in said bedcover for sensing the occurrence of an overheating condition in said bedcover, a pair of gate controlled bidirectional semiconductor switches electrically connected to one another in series and in back-to-back orientation, means electrically connecting said pair of semiconductor switches to said heating means for controlling the flow of electrical current thereto, and means electrically connecting the respective gates of said semiconductor switches to one another through said positive temperature coefficient sensing means for triggering the semiconductor switches from a conductive to a non-conductive state in response to the sensing of an overheating condition by said positive temperature coefficient sensing means.

5. An electrically heated bedcover protected against an overheating condition and comprising:
a bedcover,
electrical heating means in said bedcover for generating heat upon flow of electrical current therethrough,
comfort control means separate from said bedcover and operable for controlling conduction off alternating electrical current therethrough,
elongate cable means extending between and electrically connecting said heating means and said comfort control means, and
overheat protection means operable for interrupting the flow of electrical current to said heating means in response to an overheating condition and comprising positive temperature coefficient sensing means located in said bedcover for sensing the occurrence of an overheating condition in said bedcover, a pair of gate controlled bidirectional semiconductor switches electrically connected to one another in series and in back-to-back orientation and also electrically connected in series with said heating means for controlling the flow of electrical current thereto, and means electrically connecting the respective gates of said semiconductor switch means to one another through said positive temperature coefficient sensing means for triggering the semiconductor switches from a conductive to a non-conductive state in response to a predetermined change in the conductive characteristics of said positive temperature coefficient sensing means resulting from the occurrence of an overheating condition.

6. An electrically heated bedcover according to claim 4 or 5 wherein said positive temperature coefficient sensing means comprises a positive temperature coefficient impedance.

7. An electrically heated bedcover according to claim 6 wherein said positive temperature coefficient impedance comprises a plurality of positive temperature coefficient resistors electrically connected to one another in series and positioned in said bedcover for sensing the occurrence of an overheating condition therein.

8. An electrically heated bedcover according to claim 5 wherein said elongate cable means has a terminal end remote from said comfort control means which is adapted for connection to said heating means and further comprising mating plug means at the terminal end of said cable means for separably connecting said cable means and said heating means, said plug means including a first plug member carried by said terminal end of said cable means and a mating second plug member secured to said bedcover, and wherein said pair of semiconductor switches is carried by said plug means.

9. An electrically heated bedcover according to claim 8 wherein said pair of semiconductor switches is housed within said first plug member.

10. An electrically heated bedcover according to claim 8 wherein said pair of semiconductor switches is housed within said second plug member.

11. An electrically heated bedcover according to claim 5 wherein said pair of semiconductor switches is located at said comfort control means.

* * * * *

UNITED STATES PATENT AND TRADEMARK OFFICE
CERTIFICATE OF CORRECTION

PATENT NO. : 4,198,562

DATED : April 15, 1980

INVENTOR(S) : Edwin R. Mills and Ernest L. Elmore

It is certified that error appears in the above–identified patent and that said Letters Patent are hereby corrected as shown below:

```
Column 1, Line 19, "quantities" should be --qualities--.
Column 3, Line 37, "means" (second occurrence) should
be --mating--.
Column 7, Line 1, "sensor" should be --sense--.
Column 8, CLAIM 5, Line 5, "off" should be --of--.
```

Signed and Sealed this

Fifteenth Day of July 1980

[SEAL]

*Attest:*

*Attesting Officer*

SIDNEY A. DIAMOND

*Commissioner of Patents and Trademarks*